United States Patent

Brandt et al.

[11] Patent Number: 5,953,147
[45] Date of Patent: Sep. 14, 1999

[54] POLYGON MIRROR HAVING HIGH REFLECTANCE AND UNIFORM REFLECTANCE OVER RANGE OF INCIDENCE ANGLES

[75] Inventors: Michael B. Brandt, Walworth; Walter S. Piskorowski, Jr., Spencerport, both of N.Y.

[73] Assignee: Eastman Kodak Company, Rochester, N.Y.

[21] Appl. No.: 08/972,381

[22] Filed: Nov. 18, 1997

[51] Int. Cl.⁶ .................................................. G02B 26/08
[52] U.S. Cl. ........................... 359/212; 359/216; 359/584
[58] Field of Search .................... 359/196, 197, 359/212, 216–219, 584, 884; 347/259–261

[56] References Cited

U.S. PATENT DOCUMENTS

| 4,662,722 | 5/1987 | Buczek et al. | 359/488 |
| 4,796,962 | 1/1989 | DeJager et al. | 359/217 |
| 4,921,320 | 5/1990 | DeJager et al. | 359/205 |
| 4,930,869 | 6/1990 | Miyagawa et al. | 359/205 |
| 5,022,726 | 6/1991 | Austin et al. | 359/884 |
| 5,438,446 | 8/1995 | Brandt | 359/196 |

*Primary Examiner*—Cassandra Spyrou
*Assistant Examiner*—Darren E. Schuberg
*Attorney, Agent, or Firm*—William F. Noval

[57] ABSTRACT

A laser imaging system comprising: a laser for producing a laser beam; and a moving mirror for repetitively reflecting the laser beam over a range of incidence angles to scan the laser beam in a line scan direction; wherein the mirror includes a metallic reflective layer and a multilayer transparent coating on the metallic reflective layer, the multilayer transparent coating including alternating layers of first and second dielectric materials, the thickness of the layers and the composition of the first and second dielectric materials being chosen such that the mirror (a) achieves greater than 90% reflectance over the range of incidence angles, and (b) exhibits minimum reflectance variations over the range of incidence angles.

9 Claims, 3 Drawing Sheets

POLYGON MIRROR HAVING HIGH REFLECTANCE AND UNIFORM REFLECTANCE OVER RANGE OF INCIDENCE ANGLES

FIELD OF THE INVENTION

This invention relates in general to laser imaging systems and more particularly to laser imaging systems using a polygon mirror having high reflectance and uniform reflectance over a range of incidence angles.

BACKGROUND OF THE INVENTION

Optical image scanners for scanning an image to be stored or reproduced are well-known in the prior art. Such optical scanners are typically used in laser printers for scanning a laser generated light beam across a receiving medium. The laser source of the light beam is modulated with an image signal and scans the receiving medium with the modulated light beam to form a visible image thereon, either directly or through subsequent processing of the medium. Similar scanners are used in optical character recognition and the like to read an object, image or text for storage or reproduction.

In the known image scanning reading/writing systems, the light beam from the laser source is deflected by a rotating mirror, typically a high speed rotatable polygon having a number of facets, which deflects the incident light beam in a flat tangential field across the scanned image or the receiving medium. Optical lens systems are typically employed in the optical path of the incident light beam to shape it so as to achieve the desired beam profile at the image or receiving medium. Often an additional lens system is employed, in the optical path of the reflected beam, to correct any beam position errors in the cross-scan direction resulting from angular misalignment of the facets of the polygon shaped mirror and to provide a relatively straight, distortion free line scan. Typically in such optical scanners, the laser light beam source and its associated beam shaping lens system are fixed to direct the light beam in an optical path intersecting the "waist" of the rotating mirror facets. Therefore as the mirror rotates, the angle of incidence of the source light beam to the mirror surface changes, resulting in the angular deflection or scanning of the reflected light beam in the desired flat tangential field.

Typical optical scanners are disclosed in commonly assigned U.S. Pat. Nos. 4,796,962 and 4,921,320, incorporated herein by reference in their entireties, and the scanners described in the prior art patents referenced therein. The optical scanners disclosed in the '962 and '320 patents are employed for recording images on receiving mediums which may constitute intermediate image retaining mediums, e.g., xerographic drums, or hard copy prints of pictorial or alphanumeric information.

The '320 and '962 patents are directed to improvements in the optical system for minimizing spot size variations and achieving relatively straight line scans and flat tangential fields for creating half-tone images of good quality.

The polygon-shaped, rotating mirror employed is typically manufactured of a highly polished metal, e.g., aluminum, or a metallic coating of silver or aluminum on glass which are either left uncoated or else are overcoated with a protective dielectric coating of a metal oxide or fluoride deposited on the surface to protect the mirror surface from damage and oxidation. The thickness of this coating, if specified at all in relation to reflectance, is typically chosen to provide enhanced reflectance at some particular wave length of incident light radiation and angle of incidence. The reflectance of the mirror, be it a metallic mirror or a metallic coating on glass, is a function of the angle of incidence of the light beam. In a typical laser printer, this angle of incidence may vary over a large range depending upon the focal length of the optical system and the format size of the scanned image or receiving medium, and the resulting reflectance may likewise vary by several percent over the optical scan. The resulting reflectance variation with scan angle introduces a non-uniformity in printed images, as the intensity of the reflected light beam varies. If the image uniformity is not acceptable, correction may require incorporation of elaborate calibration and compensation technologies.

This problem with reflectance variation as a function of scan angle is noted in U.S. Pat. No. 4,930,869 which provides a light-transmissive plate angularly oriented across the incident and reflective light beam optical paths having an anti-reflection coating thereon. Employing S-polarized or P-polarized incident radiation, the transmittance of the glass plate and the angle of inclination of the glass plate are selected to compensate for the change in reflectance of the mirror facets as the incident angle changes during rotation. Such an arrangement partially compensates for the deflector mirror's reflectance variations with angle of incidence but requires additional structure enclosing the polygon shaped reflecting mirror. The reflecting coating reflects a portion of the incident light beam as stray light that must be baffled from the optical path of the scanned light beam.

In a further embodiment described in the '869 patent, the glass plate is replaced by a further reflecting mirror which itself reflects the scanning light beam reflected by the rotating mirror facets. These embodiments of the '869 patent themselves introduce both complexity and potential aberrations in the desirable flat tangential field, straight line scan and distortion described above. Moreover, they increase stray light reflectance, ghost images, and intensity losses at the interfaces created by the glass plate or the additional mirror.

The polygon-shaped mirrors presently being utilized in many printer systems consist of an aluminum substrate, carefully machined and highly polished to present optically flat facets, with a dielectric coating deposited on the facets to protect the mirror surface from oxidation. Often, the aluminum substrate is coated with a one-half wave "optical" thickness of $SiO_2$. The purpose of this silicon dioxide coating is to prevent degradation of the mirror's reflectivity by oxidation, to enhance the reflectivity of the mirror, and to provide a hard coating which protects the surface finish from degradation due to the environment and cleaning operations. The thickness of the dielectric coating, if specified at all, is generally chosen to be equal to $L_0/2NCos(i')$, where $L_0$ is the wavelength of the incident radiation, $i'$ is the angle of refraction of the incident radiation within the dielectric coating, and N is the index of refraction of the homogeneous protective coating layer, as taught, for example, in U.S. Pat. No. 4,662,722.

U.S. Pat. 5,438,446, issued Aug. 1, 1995, inventor M. B. Brandt, discloses a uniform reflectance mirror deflector of an optical scanner for scanning a light beam onto an image object or a receiving medium. The scanner includes a rotatable polygon-shaped mirror having a plurality of plane reflective mirror facets for deflecting and thereby scanning the beam through a predetermined angle while rotating and thereby varying the angle of incidence of the light beam on the deflector. In order to achieve relative uniformity of reflectance and avoid intensity variations in the reflected beam, a protective optical coating layer is selected to have a thickness which minimizes variation in reflectance over the range of angular displacement of the mirror in relation to the light source during its rotation. The thickness of the protective coating layer uniformly applied over the entire surface of each facet of the polygon-shaped mirror is determined by calculating the reflectance of P-polarized and S-polarized incident radiation components at a predetermined wave length of incident radiation over a range of protective coating film thicknesses of between 0 and one wave length and over the range of angles of incidence. Coating thicknesses in this range are selected in accordance with the resulting demonstrated relative uniformity of reflectance.

Although this scanner may have been suitable for the uses for which it was intended, there is a need to provide a polygon mirror having uniform reflectance over a range of laser beam incident angles which has a higher reflectance efficiency.

SUMMARY OF THE INVENTION

According to the present invention, there is provided a solution to the needs discussed above.

According to a feature of the present invention, there is disclosed a laser imaging system comprising: a laser for producing a laser beam; and a moving mirror for repetitively reflecting the laser beam over a range of incidence angles to scan the laser beam in a line scan direction; wherein the mirror includes a metallic reflective layer and a multilayer transparent coating on the metallic reflective layer, the multilayer transparent coating including alternating layers of first and second dielectric materials, the thickness of the layers and the composition of the first and second dielectric materials being chosen such that the mirror (a) achieves greater than 90% reflectance over the range of incidence angles, and (b) exhibits minimum reflectance variations over a wide range of incidence angles.

ADVANTAGEOUS EFFECT OF THE INVENTION

The invention has the following advantages.

1. A polygon mirror having high reflectance and uniform reflectance over a range of incidence angles.

2. Lower power laser can be used with the high efficiency mirror.

3. Reduces coating performance sensitivity to coating thickness variability.

DETAILED DESCRIPTION OF THE INVENTION

Figure 1:
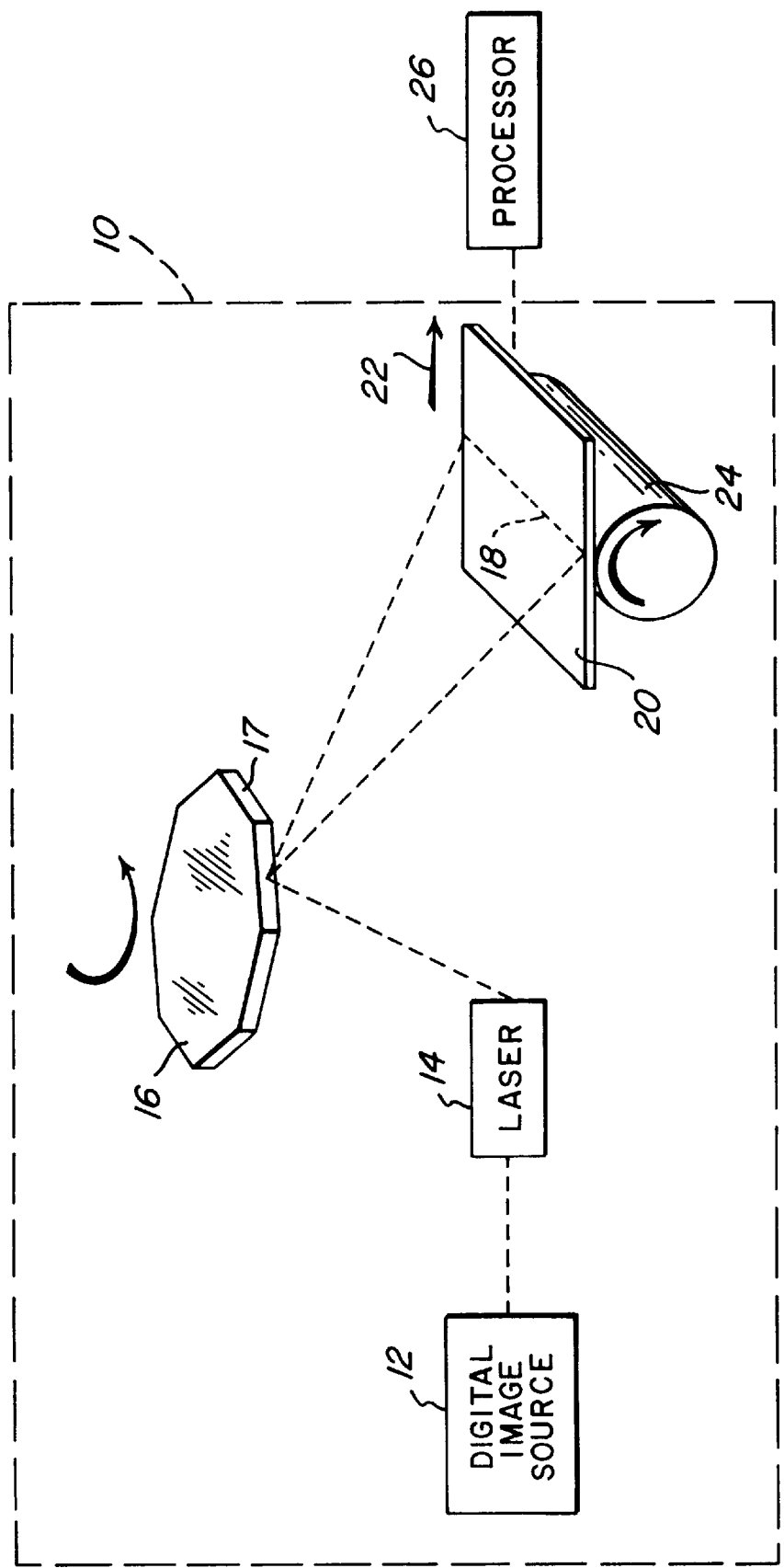
FIG. 1 is a block, diagrammatic view of a laser imaging system incorporating the present invention.

Referring now to FIG. 1, there is shown a laser imaging system, such as laser printer 10, incorporating the present invention. As shown, printer 10 includes a source 12 for a digital image (such as a digital medical image), a laser 14 modulated by a digital image from source 12, a rotatable polygon mirror 16 for reflecting the modulated laser beam from laser 12 over a range of incidence angles to scan the laser beam in a line scan direction 18 to expose photosensitive media 20 which is moved in a page scan direction 22 by drum 24. The exposed media is developed by processor 26.

Printer 10 is preferably a medical laser printer. Source 12 is a source of digital medical images, such as produced by medical image diagnostic scanners (CT, MRI, PET, US), by digitizing radiographic film, by computed or direct digital radiography, and by medical image archives. Laser 14 can be a gas or diode laser. The laser 14 may be modulated directly by the digital image or the laser beam produced by laser 14 can be modulated by an acoustooptic modulator (AOM) coupled to the digital image source 14.

The laser beam from laser 14 can be shaped by input optics (not shown) before reflection by polygon mirror 16. Polygon mirror 16 is shown as having eight facets 17, but can have more or less facets. The reflected laser beam can be corrected and expanded by output optics (not shown) before it scans media 20. Photosensitive media 20 can be conventional wet processed film or paper or photothermographic film or paper. In the latter case, processor 26 is a dry thermal processor; in the former case, processor 26 is a conventional wet chemical processor.

Polygon mirror 16 and drum 24 cooperate to expose media 20 to a raster scanned image representative of the digital image.

Figure 2:
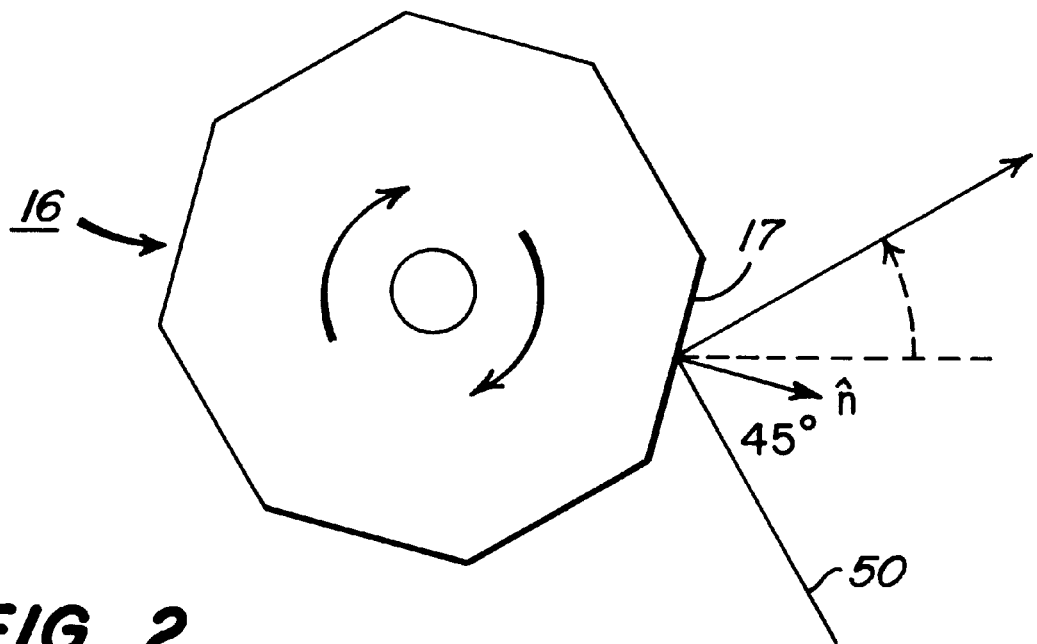
FIGS. 2 and 3 are illustrations of the reflectance of an incident laser beam by a polygon mirror at the start and end of scan, respectively.
Figure 3:
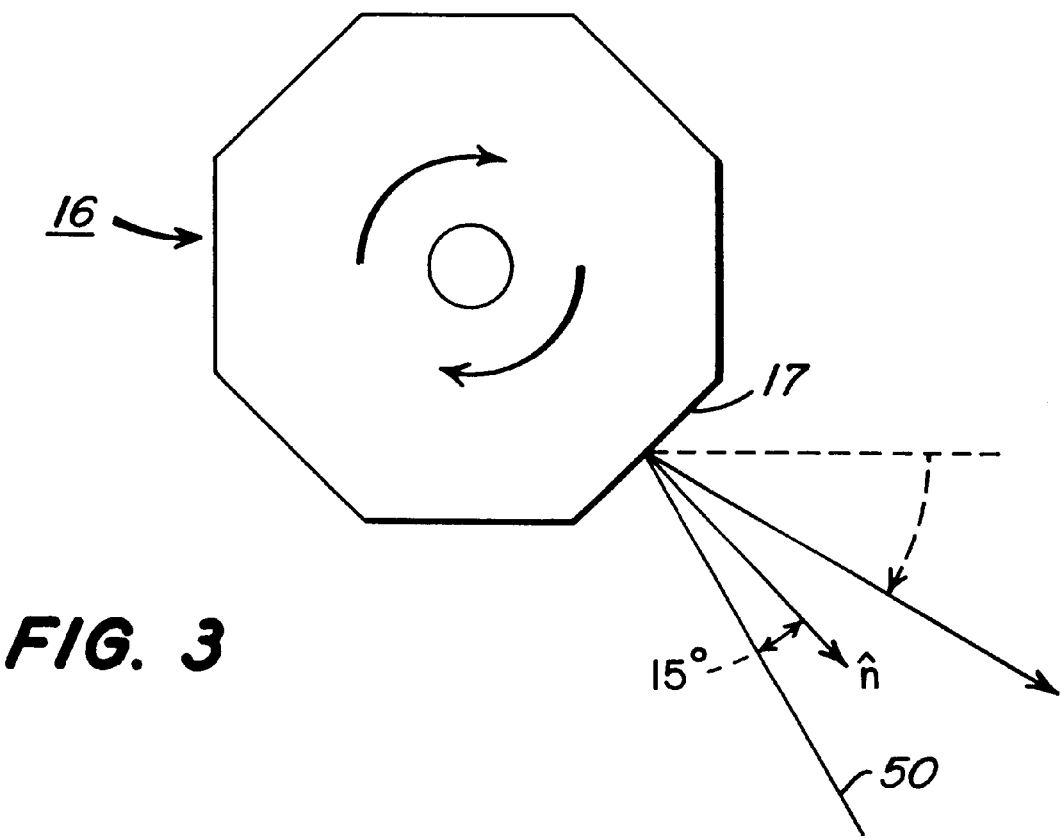

Turning now to FIGS. 2 and 3, they illustrate the reflectance of the incident light beam 50 from a facet 17 at the start and end of a scanning line.

In FIG. 2, at the start of scan, the incident light beam 50 strikes the fact 17 at a 45° angle to its normal direction and is reflected at 45° from normal. In FIG. 3, the incident light beam 50 strikes the facet 17 at 15° to normal and is likewise reflected away at 15° from normal. Although not depicted in FIGS. 2 and 3, it will be understood that at midpoint in a scan, the incident light beam 50 strikes the facet 17 at 30° of normal and the dotted line projections in FIGS. 2 and 3 indicate the midpoint reflectance of 30° in the center of the planar array of the reflected light beam. The planar array is defined by the dotted-line arrows shown in FIGS. 2 and 3.

If the reflectance varies over the angular range of incident light, then the intensity of the scanning beam will likewise vary across the planar array, causing image density to suffer. Similarly, if the facet to facet reflectance varies, image quality will suffer on a line by line basis; however, this latter artifact is easily compensated for with electronics or software correction.

When photothermographic media, such as dry silver media, is used in printer 10, the media requires very high exposures, i.e., high laser power is required. Larger wavelength lasers typically provide higher laser power. If the dry silver media has a sensitivity over a range of 650 to 700 nm, use of a diode laser at the upper end of this range is desirable. However, the highest power laser diodes available at these wavelengths were not adequate enough by themselves.

In order to achieve effective laser power, the optical system transmittance efficiency has to be improved, particularly the reflectance efficiency of the polygon mirror. The single layer uniform reflectance coating on the polygon mirror disclosed in U.S. Pat. No. 5,438,446 (discussed above) only has a reflectance of 80% and therefore proved inadequate.

Figure 4:
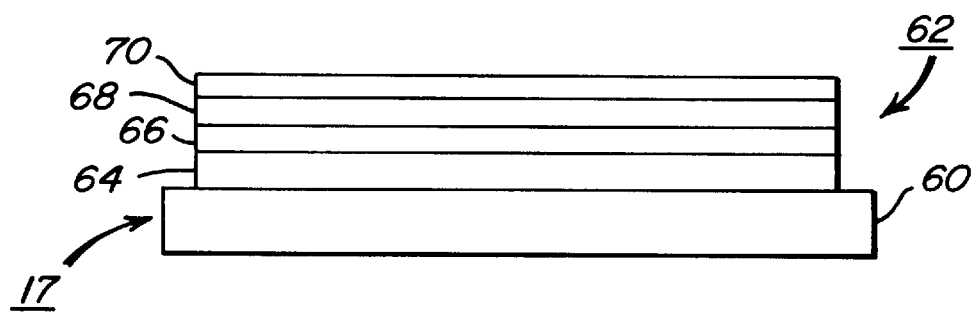
FIG. 4 is a cross-sectional elevational view of a mirror according to the invention.

According to the present invention, there is provided a multilayer coating for a polygon mirror which has high reflectance (i.e., 95%) as well as uniform reflectance over the 15° to 45° range of laser beam incidence angles. Referring to FIG. 4, there is shown a preferred embodiment of multilayer coating. As shown, each facet 17 of polygon mirror 16 includes a highly polished metallic (aluminum) reflective layer 60 having a multilayer transparent layer 62. Layer 62 has alternating layers 64,66,68,70 of first and second dielectric materials, such as silicon dioxide ($SiO_2$) and titanium dioxide ($TiO_2$). Layers 64 and 68 of $SiO_2$ have a preferable thickness of 140 to 150 nm, such as 144 nm. Layers 66 and 70 of $TiO_2$ have a preferable thickness of 75 to 85 nm, such as 80 nm. It should be noted that these thicknesses are not equivalent to the industry standard coating practice of making each layer one-quarter wave optical thickness as in the case of trying to achieve highest reflectance. That practice would dictate that the $TiO_2$ and $SiO_2$ coating thicknesses should be 76 nm and 125 nm, respectively. Such a coating exhibits a variation in reflectance of 1.25% over the range of incidence angles of 15° to 45°. It will be understood that other dielectric materials may be used at appropriate thicknesses. It will also be understood that less or more layers of dielectric material may be used. The criteria for choosing such materials and dimensions is that the mirror (1) have reflectance of 90% or more, and (2) have uniform reflectance (e.g., reflectance variations of less than 0.5% peak to peak) over a wide range of incidence angles (such as 15°–45°).

Figure 5:
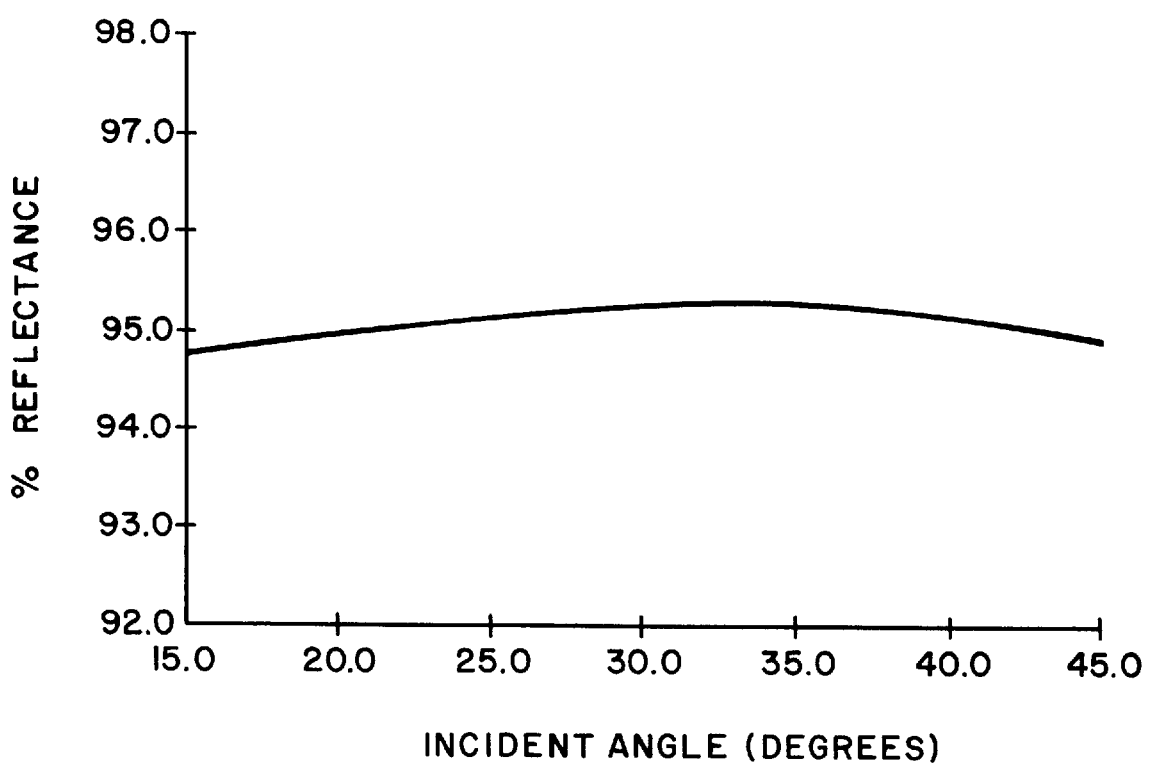
FIG. 5 is a graphical view of reflectance versus laser beam incident angle for the mirror of FIG. 4.

FIG. 5 shows a graphical view of % reflectance versus incident angle for a polygon mirror facet having an aluminum reflective layer and a four layer dielectric layer of 144 nm $SiO_2$, 80 nm $TiO_2$, 144 nm $SiO_2$, and 80 nm $TiO_2$. As shown, the mirror facet has a substantially uniform 95% reflectance over a 15–45° range of incident angles.

It will be understood that although the present invention has been described as incorporated in a multifaceted polygon mirror used in a laser printer, it can be used in other types of scanning mirrors, such as reciprocating galvo mirrors, and in other applications using scanning lasers, such as computed radiography and digitizers. It will also be understood that the invention may be practiced employing a wide variety of mirror and dielectric coating materials, including metal oxides, fluorides, sulfides of silicon, aluminum, magnesium, tantalum, etc.

The invention has been described in detail with respect to preferred embodiments thereof, but it will be understood that variations and modifications can be effected within the spirit and scope of the invention.

| PARTS LIST | |
|---|---|
| 10 | laser printer |
| 12 | source |
| 14 | laser |
| 16 | rotatable polygon mirror |
| 17 | facet |
| 18 | line scan direction |
| 20 | photosensitive media |
| 22 | page scan direction |
| 24 | drum |
| 26 | processor |
| 50 | light beam |
| 60 | metallic reflective layer |
| 62 | multilayer transparent layer |
| 64,66,68,70 | alternating layers |

What is claimed is:

1. A laser imaging system comprising:
   a laser for producing a laser beam; and
   a moving mirror for repetitively reflecting said laser beam over a range of incidence angles to scan said laser beam in a line scan direction;
   wherein said mirror includes a metallic reflective layer and a multilayer transparent coating on said metallic reflective layer, said multilayer transparent coating including alternating layers of first and second dielectric materials, the thickness of said layers and the composition of said first and second dielectric materials being chosen such that said mirror (a) achieves greater than 90% reflectance over said range of incidence angles, and (b) exhibits less than 0.5% peak to peak reflectance variations over said range of incidence angles.

2. The system of claim 1 wherein said metallic reflective layer is aluminum, wherein said first and second dielectric materials are silicon dioxide and titanium dioxide.

3. The system of claim 1 wherein said range of incidence angles is about 15° to about 45° and said minimum reflectance variations is less than 0.5% peak to peak over said range of incidence angles.

4. A laser imaging system comprising:
   a laser for producing a laser beam; and
   a rotatable polygon mirror having a plurality of mirror facets for repetitively reflecting said laser beam over a range of incidence angles to scan said laser beam in a line scan direction;
   wherein each of said mirror facets includes a metallic reflective layer and a multilayer transparent coating on said metallic reflective layer, said multilayer transparent coating including alternating layers of first and second dielectric materials, the thickness of said layers and the composition of said first and second dielectric materials being chosen such that said mirror (a) achieves greater than 90% reflectance over said range of incidence angles, and (b) exhibits less than 0.5% peak to peak reflectance variations over said range of incidence angles.

5. The system of claim 4 wherein said metallic reflective layer is aluminum, wherein said first and second dielectric materials are silicon dioxide and titanium dioxide, wherein said range of incidence angles is about 15° to about 45°, and wherein said minimum reflectance variations is less than 0.5% peak to peak over said range of incidence angles.

6. A laser imaging system comprising:
   a laser for producing a laser beam; and
   a rotatable polygon mirror having a plurality of mirror facets for repetitively reflecting said laser beam over a range of incidence angles of about 15° to about 45°, to scan said laser beam in a line scan direction;
   wherein each of said mirror facets includes an aluminum reflective layer and a four layer transparent coating on said aluminum reflective layer, said four layer transparent coating including alternating layers of silicon dioxide and titanium dioxide, the thickness of said silicon dioxide layers being about 140 to about 150 nanometers (nm), and the thickness of said titanium dioxide layers being about 75 nm to about 85 nm, such that said mirror (a) achieves greater than 90% reflectance over said range of incidence angles, and (b) exhibits reflectance variations of less than 0.5% peak to peak over said range of incidence angles.

7. The system of claim 6 wherein said thickness of said silicon dioxide layers is about 144 nm, wherein said thickness of said titanium dioxide layers is about 80 nm, and wherein said mirror achieves about 95% reflectance over said range of incidence angles.

8. A medical laser printer comprising:
   a source of a digital medical image;

a laser for producing a laser beam which is modulated by said digital medical image; and a rotatable polygon mirror having a plurality of mirror facets for repetitively reflecting said modulated laser beam over a range of incidence angles to scan said laser beam in a line scan direction to expose photosensitive media moved in a page scan direction;

wherein each of said mirror facets includes a metallic reflective layer and a multilayer transparent coating on said metallic reflective layer, said multilayer transparent coating including alternating layers of first and second dielectric materials, the thickness of said layers and the composition of said first and second dielectric materials being chosen such that said mirror (a) achieves greater than 90% reflectance over said range of incidence angles, and (b) exhibits reflectance variations of less than 0.5% peak to peak over said range of incidence angles.

9. The laser printer of claim 8 wherein said exposed photosensitive media is photothermographic film and including a thermal processor cooperatively associated with said printer for developing said exposed photothermographic film.

* * * * *